(12) United States Patent
Fledderjohann et al.

(10) Patent No.: US 6,499,980 B1
(45) Date of Patent: Dec. 31, 2002

(54) AUTOMATED GREEN TIRE CONVEYANCE SYSTEM

(75) Inventors: Paul Frederick Fledderjohann, Clinton, OH (US); George William Eizenzimmer, Uniontown, OH (US); David John McKee, Napanee (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/857,283

(22) PCT Filed: Dec. 16, 1998

(86) PCT No.: PCT/US98/26724
§ 371 (c)(1),
(2), (4) Date: May 30, 2001

(87) PCT Pub. No.: WO00/35665
PCT Pub. Date: Jun. 22, 2000

(51) Int. Cl.⁷ .................................. B29C 35/02
(52) U.S. Cl. ...................... 425/34.1; 414/222.01; 414/609; 414/806; 414/814; 425/38
(58) Field of Search ............ 425/34.1, 38; 414/222.01, 414/609, 806, 814

(56) References Cited

U.S. PATENT DOCUMENTS

| | | | |
|---|---|---|---|
| 3,030,658 A | | 4/1962 | Soderquist |
| 3,053,400 A | | 9/1962 | Erickson et al. |
| 3,378,882 A | * | 4/1968 | Turk et al. ............... 425/38 |
| 3,895,716 A | | 7/1975 | Ugo |
| 4,268,219 A | | 5/1981 | Nakagawa et al. |
| 4,332,536 A | * | 6/1982 | Singh et al. ............ 425/34.1 |
| 4,629,385 A | | 12/1986 | Irie |
| 4,773,810 A | | 9/1988 | Nishimura et al. |
| 4,778,060 A | | 10/1988 | Wessner, Jr. |
| 4,950,142 A | | 8/1990 | Katayama et al. |
| 4,993,906 A | * | 2/1991 | Nisimura et al. ...... 414/222.13 |
| 5,354,404 A | | 10/1994 | Benjamin |
| 5,631,028 A | | 5/1997 | Mizokawa et al. |

FOREIGN PATENT DOCUMENTS

| | | |
|---|---|---|
| FR | 2308565 | 4/1976 |
| FR | 2399910 | 3/1979 |
| HN | 117 200 | 1/1976 |

* cited by examiner

Primary Examiner—James P. Mackey
(74) Attorney, Agent, or Firm—Howard M. Cohn

(57) ABSTRACT

An automated conveyance system moves green tires (24) with monorail carriers (18) to tire molding presses (40). Each monorail carrier (18) deposits a green tire (24) into an elevator system (31) which, in turn, transfers the green tire to within reach of a press loader (38) for tire press (40). The elevator system (31) also provides a buffer storage for the tires in process. In one embodiment, the green tire in the basket (28) is rotated about a vertical path through which the basket moves to within reach of the press loader. In another embodiment, the elevator system (31) can move the green tire by linear translation from the vertical path through which the basket moves to within reach of the loader (38).

13 Claims, 5 Drawing Sheets

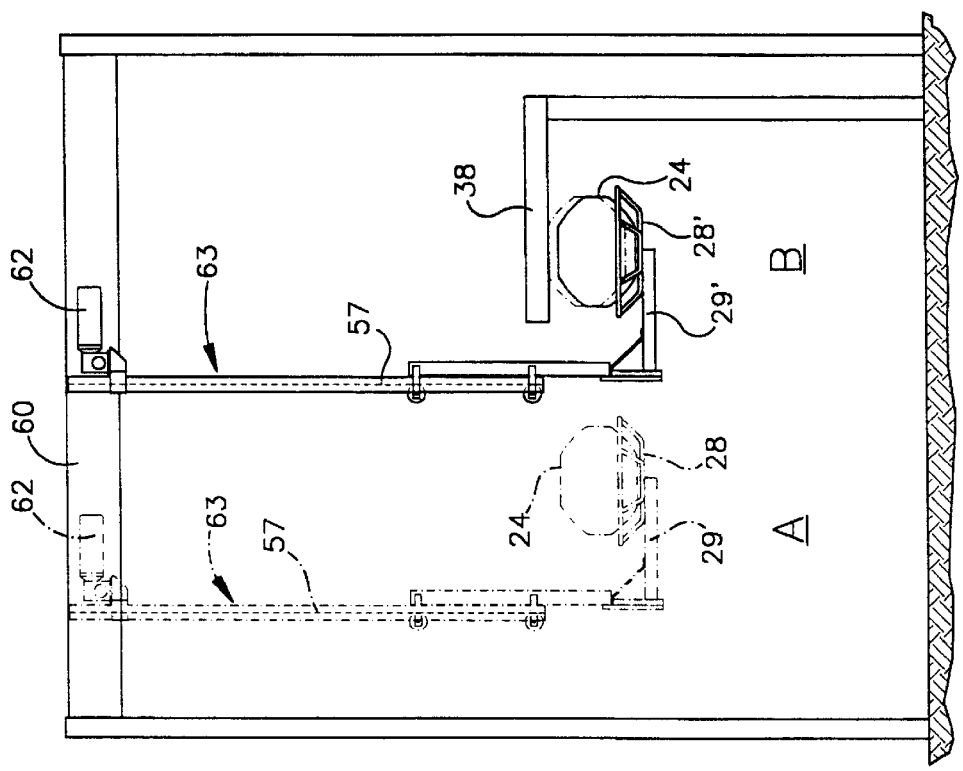
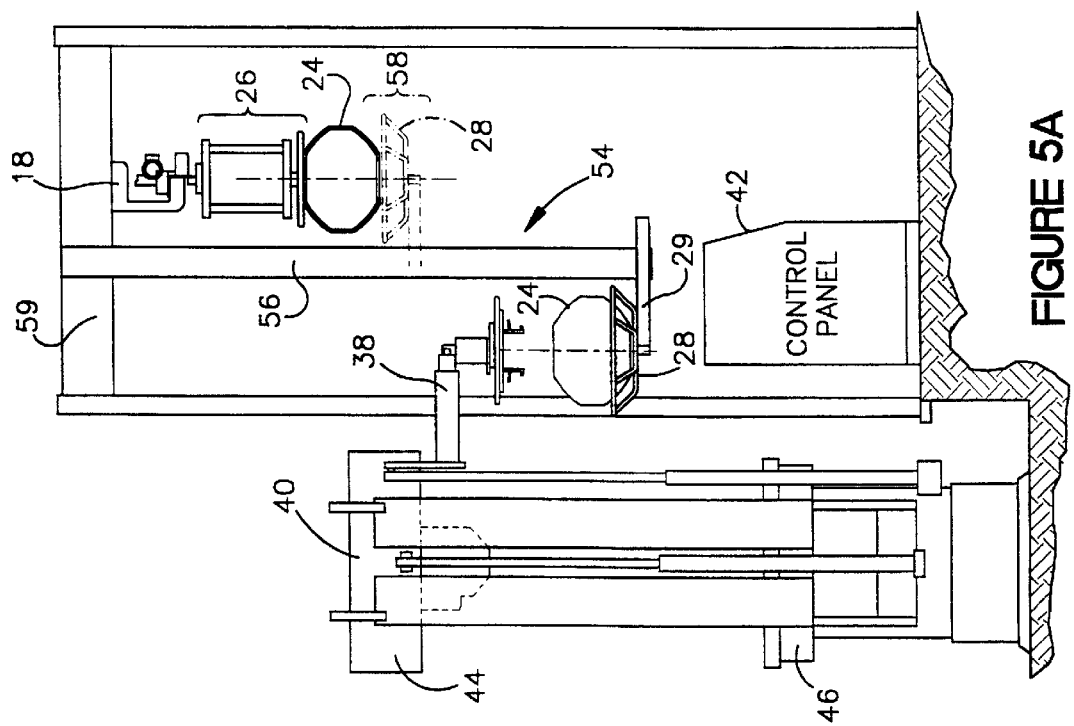
FIGURE 5B
FIGURE 5A

AUTOMATED GREEN TIRE CONVEYANCE SYSTEM

TECHNICAL FIELD

The present invention relates to automated monorail conveyance systems for transporting green tires (i.e., unvulcanized tires) within a tire manufacturing factory and more specifically to an elevator system incorporated in the monorail conveyance system for transferring the green tire from a monorail to a tire molding press.

BACKGROUND OF THE INVENTION

Tire manufacturing factories are arranged into separate areas within which specific tire manufacturing operations take place. Two manufacturing steps having major significance in relation to the present invention are the tire assembly process and the tire curing, or vulcanizing process. These two processes take place in separate locations within a manufacturing operation, typically within a single building of the tire building factory.

In brief summary, tires are assembled in an uncured or unvulcanized state in one part of a factory, and then moved to another part of the factory where they are inserted into heated tire presses wherein the tire is molded under heat and pressure and, in the same process, vulcanized.

More specifically, the tire assembly process involves the use of a tire building machine which includes a cylindrical assembly drum upon which such tire components as the inner liner, the cord-reinforced plies, the beads and the sidewalls of the "green carcass" are assembled into a cylindrical shape. The green carcass then undergoes an initial "blow up" into a toroidal shape more closely resembling a typical tire. The blow-up process typically coincides with the installation upon the green carcass of the belt structure, fabric overlay and tread cap, all of which are typically assembled upon a separate "ring" into which the green carcass is expanded during the blow-up process. After this initial blow-up process in which the green carcass is joined with the belt structure and tread cap, certain additional tire components are typically added, such as the two shoulder skirts which are applied as uncured rubber layers, each of which lies over one of the two respective circumferential juncture lines where the edge of the tread cap joins with the sidewall. This description of the assembly of a "green tire" is only exemplary. Other methods of tire assembly can be used, as when, for example, the tire's sidewalls are assembled upon the green carcass after the blow-up process and after the belt structure and tread cap have been installed upon the toroidally shaped green tire.

After the green tire has been assembled, it must be moved to the port-on of the tire-manufacturing facility or building wherein the tire is molded and cured. The molding and curing are performed in a heated tire molding press in which the external rubber surfaces of the green tire are shaped, as with the tread pattern, under pressure. The tire molding press also heats the tire so as to induce the curing or vulcanizing process during which the previously uncured rubber undergoes thermally induced chemical changes that result in the formation of the kinds of firm, stabilized, shape-holding rubber that is typical of a finished tire.

The two above-described processes are separated in time by the transport of the green tires from the tire assembly area to the location of the curing presses. Often, if not typically, the transport of the green tires involves a layover of the green tires within an intermediate storage area. A given green tire is stored until an appropriate press, one that is suited for that specific type of green tire, is ready to receive the tire. Thus the tires that are assembled in a typical tire-building process are commonly not all of the same type or size. In other words, multiple types of tires are assembled in the tire-building region of the factory. Correspondingly, each different tire type (or size) must be cured in a press that has been set up to receive specific tire types and to shape and cure the specific tire types.

A multiplicity of considerations come into play in the period of time from when the tire is assembled to when it is cured. One consideration is whether or not the tire must be physically transported to the intervening storage area prior to being moved to the curing press. Tire transport typically involves the use of such vehicles as fork-lift trucks or similar wheeled vehicles upon which the green tires can be loaded for transport and then unloaded. Another consideration is that each different tire type must be accounted for and readily retrievable from within the storage area. That is, each green tire must be easily identifiable so that it can be retrieved from the storage area and then transported to the appropriate tire curing press for insertion into the press as soon as the appropriate press becomes available to receive the green tire. Another consideration is that the manufacturing facility must be designed to accommodate the wheeled transfer vehicles, that is, it must have wide surfaces "roads" upon which the wheeled vehicles can travel with sufficient room so as to minimize the chances of a collision between the vehicle and stationary objects or with other vehicles or with people. Another consideration is that the storage area must be large enough to accommodate sufficient numbers of each given type of tire so that at no time, ideally, will any curing press or presses be removed from service for want of a tire in need of molding and curing. The storage area also acts as a buffer zone from which a supply of green tires can be withdrawn even if there is a slowdown in the tire assembly process due to disabled machinery or other hold-up problems.

Tires that are moved from the assembly area to the storage area and then to the curing area are labeled in the assembly area. That is, a tag of some sort is put on the tire, identifying its type, size and other parameters which determine the specific curing press type to which it is to be delivered for final molding and vulcanizing. The tag is also placed in such a location on the tire as to indicate the green tire's proper orientation when it is finally delivered to, and loaded into, the curing press. That is to say, the orientation of the tire within the curing press is not random. Rather the tire is preferably placed in the press at a precise rotational orientation determined by numerous factors that are not specifically relevant to the present invention and are therefore not discussed herein.

The above-described transport, storage, press-loading process and intermediate accounting steps in the tire manufacturing process have traditionally been labor intensive in the physical sense. That is, human beings have been used to manually load and unload the green tires upon the transport vehicles as well as to drive the vehicles. Also, it was necessary to locate specific stored tires, to properly read each tire's identifying label, to transport the tire to storage or from storage or to the specific curing presses for each specific tire type, and to load the tire into the press according to the angular orientation needed for that specific tire.

Among the challenges presented by the above-described method of operation is the use of wheeled transport vehicles within the same areas used by human laborers, which presents obvious safety hazards. Another challenge is that large portions of the factory floor area are used by the pathways upon which the transport vehicles move. Yet another disadvantage of previous methods of operation is the amount of time consumed in locating and identifying given tire types within the storage area. Still another disadvantage is that manual movement of the tires, to or from transport vehicles in the tire assembly area and in the storage area, can result in damage to the green tires. Furthermore, the use of human labor in the loading and unloading of heavy green tires can lead to musculoskeletal difficulties for the laborers. Finally, the size of the storage area must be large enough to accommodate both people and vehicles as well as to hold a sufficient number of tires so that specific tire types can be readily and rapidly located and retrieved for transport to the appropriate curing presses.

Various methods of automated and computer-managed tire processing methods have been brought into use in recent years. For example, self-guiding trucks have been used to convey green tires that are loaded and unloaded by means of "robots" of various types and capabilities. These trucks are sometimes guided by floor-mounted rail systems, or even by "reading" lines that are painted upon the floor areas upon which the vehicles move. In one method, described in U.S. Pat. No. 5,631,028, self-guiding, self-propelled wheeled "conveyor" vehicles drive along special roadways. The conveyor vehicles carry "pallets," each of which carries four tires. The tire storage area is actually a pallet storage area within which both loaded and empty pallets are stored. Robot arms are used to move the green tires to and from the pallets, which, at the time of loading or unloading, may or may not be situated upon a conveyor vehicle. Among the disadvantages of such a system is the large proportion of factory floor area needed to accommodate the roadways and the storage areas for pallets that might or might not have green tires on them.

A patent of particular relevance in regard to automated in-factory green tire transport is U.S. Pat. No. 4,268,219 ('219), entitled "Green Tire Conveying Method and Apparatus," by Nakagawa et al. FIG. 5 in the Nakagawa patent shows a conveyor system that appears to incorporate a monorail, though the term "monorail" is not used per se within the patent. The Nakagawa patent addresses centrally located automated control from a site within the factory. The '219 patent also refers to the use of a "demand signal," which is not specified as being by wire or radio, as a communication link with the rail-borne "trucks." The apparent monorail trucks of the '219 patent are able to deliver tires directly into the tire presses. The Nakagawa patent also includes a buffer storage area located between the tire-building part and the tire press part of the factory.

OBJECTS OF THE INVENTION

It is an object of the present invention to provide an automated monorail transport system as defined in one or more of the appended claims and, as such, having the capability of being constructed to accomplish one or more of the following subsidiary objects.

One object of the present invention is to provide an automated monorail transport system for automating that part of the tire manufacturing process that involves the transport of tires from the location of green tire assembly to the location of the curing presses where the green tires are molded and vulcanized.

Another object of the present invention is to provide an automated monorail transport system to minimize the portion of factory floor area that would otherwise be given over to roadways wide enough to safely accommodate both human beings and powered wheeled vehicles.

Yet another object of the present invention is to provide an automated monorail transport system that maintains a real-time, computer-based accounting of the location in storage or in transport of each green tire according to type and curing press to which it is to be delivered.

Still another object of the present invention is to provide an automated monorail transport system with automated means by which to rotate each green tire to an optimal angular orientation prior to insertion into the tire molding press.

Another object of the present invention is to provide an automated monorail transport system that reduces the number of monorail carriers used to transport green tires from the buffer storage to the curing presses.

Another object of the present invention is to provide an automated monorail transport system that reduces the number of human beings involved in the physical handling, loading and unloading of green tires and to eliminate both the ergonomic problems associated with manual handling of green tires and the potential for manual-induced damage to uncured tires.

Still another object of the present invention is to provide an automated monorail transport system with automated means for identifying and sorting green tires during transport from the tire assembly area to the tire curing/vulcanizing area of the factory.

Another object of the present invention is to provide an automated monorail transport system that incorporates multiple tire-storage buffers between the monorail and the tire press.

A further object of the present invention is to provide an automated monorail transport system that accommodates tire presses of the kind that open vertically.

Yet another object of the present invention is to provide an automated monorail transport system with central computer management of the automated monorail tire transport system.

SUMMARY OF THE INVENTION

The present invention relates to automated monorail conveyance systems for transporting green tires (i.e., unvulcanized tires) within a tire manufacturing factory. More specifically, the present invention relates to the transport of a plurality of green tires to a plurality of tire curing presses. It includes a monorail track upon which ride one or more monorail transport carriers. The conveyance system is characterized by one or more elevator systems located near each of the plurality of the tire presses for receiving green tires from the monorail carriers. Each of the elevator systems has an elevator that is vertically moveable for conveying green tires from the monorail carriers to a loader of the tire press. The elevator can ride upon a vertical support rail and includes a supporting arm with a basket mounted at the distal end of the arm. In operation, the basket receives a green tire from a monorail truck at a first location and is then moveable along a vertical path to a second location where the green tire is unloaded from the basket by a loader of the press.

In one embodiment, the supporting arm and basket of the elevator system can be angularly moveable in a horizontal plane about a vertical axis extending through the vertical support rail.

In a second embodiment, the elevator system can also be moveable in horizontal linear translation from the second location to a third location where the tire is unloaded by a press loader.

A tire-grasping portion of each of the monorail carriers can angularly orient each green tire about the tire's axis such that subsequent angular motions of the elevator system and the press loader are taken into account in delivering the green tire at a predetermined angular orientation to the press. The basket of the elevator system in conjunction with the press loader associated with each press act functions as a buffer storage for the green tires in process.

The present invention is also directed to a method for conveying a plurality of green tires to a plurality of tire-curing presses with one or more monorail transport carriers. The method includes a transferring step wherein each green tire is transferred from one of the monorail carriers to a loader of a tire press. The transferring step includes movement of a green tire along a vertical path from a first location where the tire is transferred from the monorail carrier to an elevator to a second location. The transferring step can include angular movement of the green tire within a horizontal plane from its position at the first location to its position at the second location where the green tire can be transferred to the loader of the press. The transferring step of the present invention can also involve a horizontal translation movement of the green tire from the second location to a third location where the green tire is transferred to the loader of the press.

The method of the invention can also include a step of angularly orienting each green tire about its axis while still being carried by the monorail carrier in such a way that subsequent angular motions while transferring the green tire are accounted for placing the tire in the tire press at a predetermined angular orientation. The method of the invention further includes providing a buffer storage for the green tires between the location where the green tire is transferred to the elevator system from the monorail carrier and the press loader.

BRIEF DESCRIPTION OF THE DRAWINGS

The structure, operation, and advantages of the invention will become further apparent upon consideration of the following description taken in conjunction with the accompanying drawings, wherein:

FIG. 5A is a side view of a ceiling-suspended tire-receiving elevator and basket; and FIG. 5B is a side view of another embodiment of a ceiling-mounted tire-receiving elevator and basket which is able to translate rather than having a swiveling basket arm.

DEFINITIONS

Figure 1:
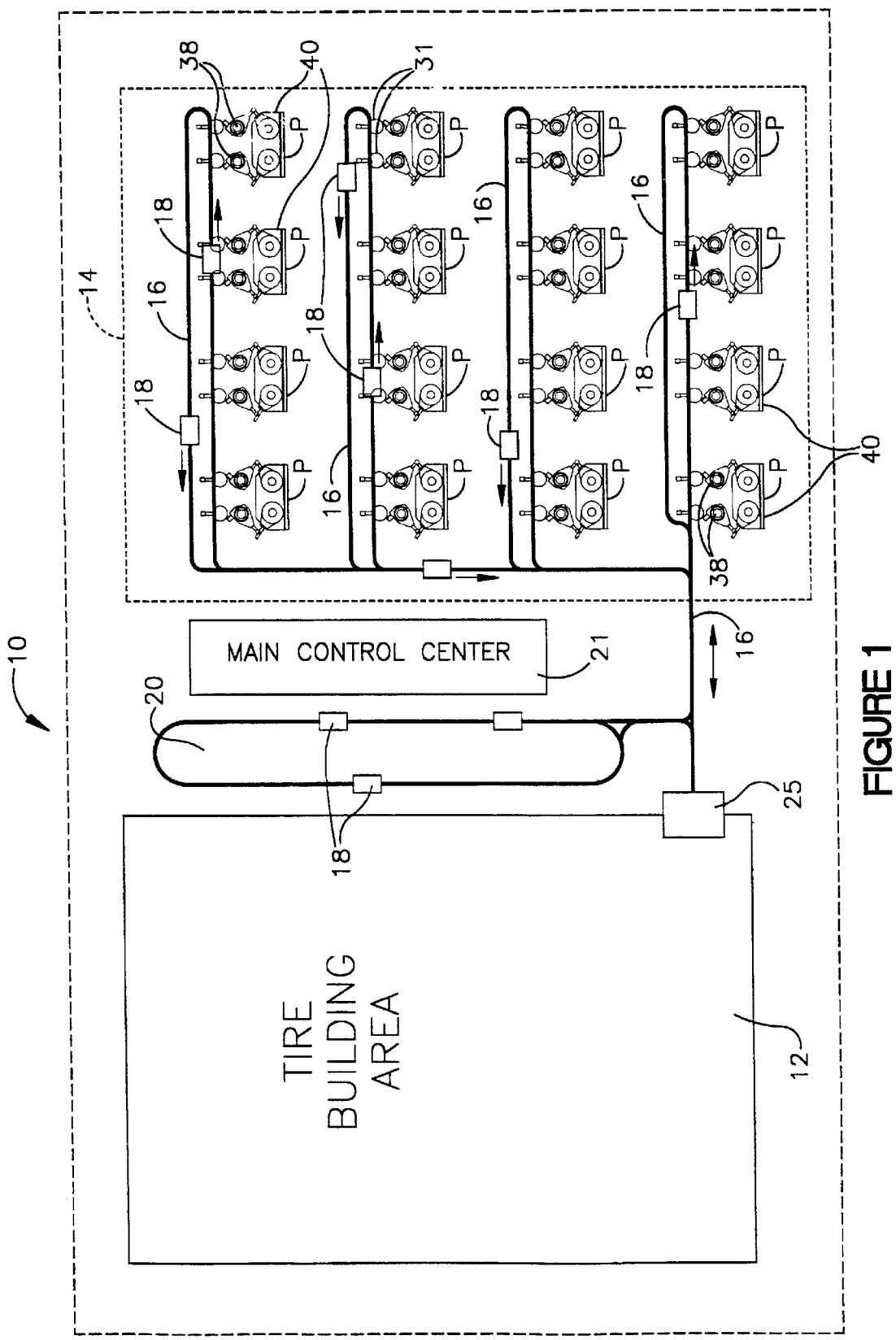
FIG. 1 is a schematic diagram showing the layout of a factory in which green tires are assembled in one area and then transported to another area where they are molded and cured.

"Axial" and "Axially" means the lines or directions that are parallel to the axis of rotation of the tire.

"Bead" or "Bead Core," generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcement Belts" or "Belt Package" means at least two annular layers or plies of parallel cords, woven or unwoven, underlying the tread, unanchored to the bead, and having both left and right cord angles in the range from 18° to 30° relative to the equatorial plane of the tire.

"Breakers" or "Tire Breakers" mean the same as belt or belt structure or reinforcement belts.

"Carcass" means the tire structure apart from the belt structure, the tread, and the undertread over the plies, but including the beads.

"Casing" means the carcass, belt structure, beads, sidewalls and all other components of the tire excepting the tread and undertread.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Crown" or "Tire Crown" means the tread, tread shoulders and the immediately adjacent portions of the sidewalls.

"Curing" is the same as "vulcanizing" which refers to the cross-linking of the polymers comprising the elastomeric rubber compounds which are, by weight, the main constituents of tires.

"Elevator system" refers to the intermediate tire conveying device which receives individual green tires from the monorail carrier and moves the tires to within grasping range of the loaders on a tire press.

"Gauge" refers to thickness.

"Inner Liner" means the layer or layers of elastomer or other material that form the inside surface of a tubeless tire and that contain the inflating gas or air within the tire.

"Lateral" means a direction parallel to the axial direction.

"Molding" is the process by which a green tire is subjected to heat and pressure within a curing press that imprinted the tire's finished shape and structure and vulcanizes the tire's uncured rubber components.

"Ply" means a cord-reinforced layer of rubber-coated radially deployed or otherwise parallel cords.

"Radial" and "radially" mean directions radially toward or away from the axis of rotation of the tire.

"Shoulder" means the upper portion of sidewall just below the tread edge.

"Sidewall" means that portion of a tire between the tread and the bead.

"Tread Cap" refers to the tread and the underlying material into which the tread pattern is molded.

"Tread width" means the arc length of the tread surface in the plane that includes the axis of rotation of the tire.

"Truck" or "Carrier" refers to the monorail vehicles that convey green tires within the factory.

"Vulcanizing" is the same as "curing" which refers to the cross-linking of the polymers comprising the elastomeric rubber compounds which are, by weight, the main constituents of tires.

DETAILED DESCRIPTION OF THE INVENTION

The GREEN TIRE AUTOMATED MONORAIL SYSTEM (GTAMS) of the present invention is intended for use as an integral part of an automated tire factory. GTAMS is referred to within the following description variously as a monorail, a monorail system, an automated monorail transport system and as a green tire monorail conveyance system unless the term "monorail" is used in specific contextual reference to the monorail component of the green tire automated monorail system.

FIG. 1 shows a schematic floor layout of an automated green tire conveyance system 10 contained within a tire factory. The tire factory comprises two main regions which the green tire conveyance system services: a tire building area 12, where the green tires are assembled on tire-building drums and then expanded into characteristic toroidal tire shapes, and the tire press area 14. The tire press area 14 contains a plurality of pairs of presses 40, which are also designated by the letter P. Adjacent to the rows of presses P are rails 16 along which run a plurality of self-powered, monorail carriers 18. Each of the carriers 18 transports a single green tire from the tire assembly area to the specific presses P that are prepared to receive, mold and cure specific types and models of green tires. For example, tires for large vehicles such as earth-moving vehicles are sent to presses that are prepared to receive large tires, while low-profile passenger vehicle tires are conveyed by the monorail system to other types of presses. Tires are moved from the tire building area 12 by way of exit portal 25 and then onto the monorail carriers 18 which run on the monorail tracks 16 which lead to the tire presses designated by P.

In addition to the rails 16 of the GTAMS system within the factory 10, the GTAMS can include a monorail carrier maintenance and/or buffer storage loop 20 and a main control center 21. Green tires can be stored in the buffer storage loop 20 if the system is not ready to immediately transfer the tires to the press area 14. The main control center 21 comprises a system of computers and software and radio transmission systems such as for example the type of system disclosed in U.S. Pat. No. 4,268,219 of Nakagawa et al., which work together to accomplish the following green-tire transport functions:

1. Maintain a running inventory of all tires in the production loop according to tire type and each tire's location within the factory and its processing status;
2. Maintain a graphical display of the factory floor and the locations of each monorail carrier 18, whether the carrier is carrying a green tire or is returning to the tire assembly area 12 to receive a green tire, or is picking up a tire in the buffer storage/monorail carrier maintenance loop 20; and
3. Maintain central radio linkages, for data and operational control, to all of the monorail carriers, feeding information to, and receiving data from each carrier, directing its movements and coordinating the movement of each carrier with respect to each other carriers and with respect to destinations while en route.

Barcode Reader, Tire Rotation, and Real-Time Tire Tracking

Figures 2A, 2B:
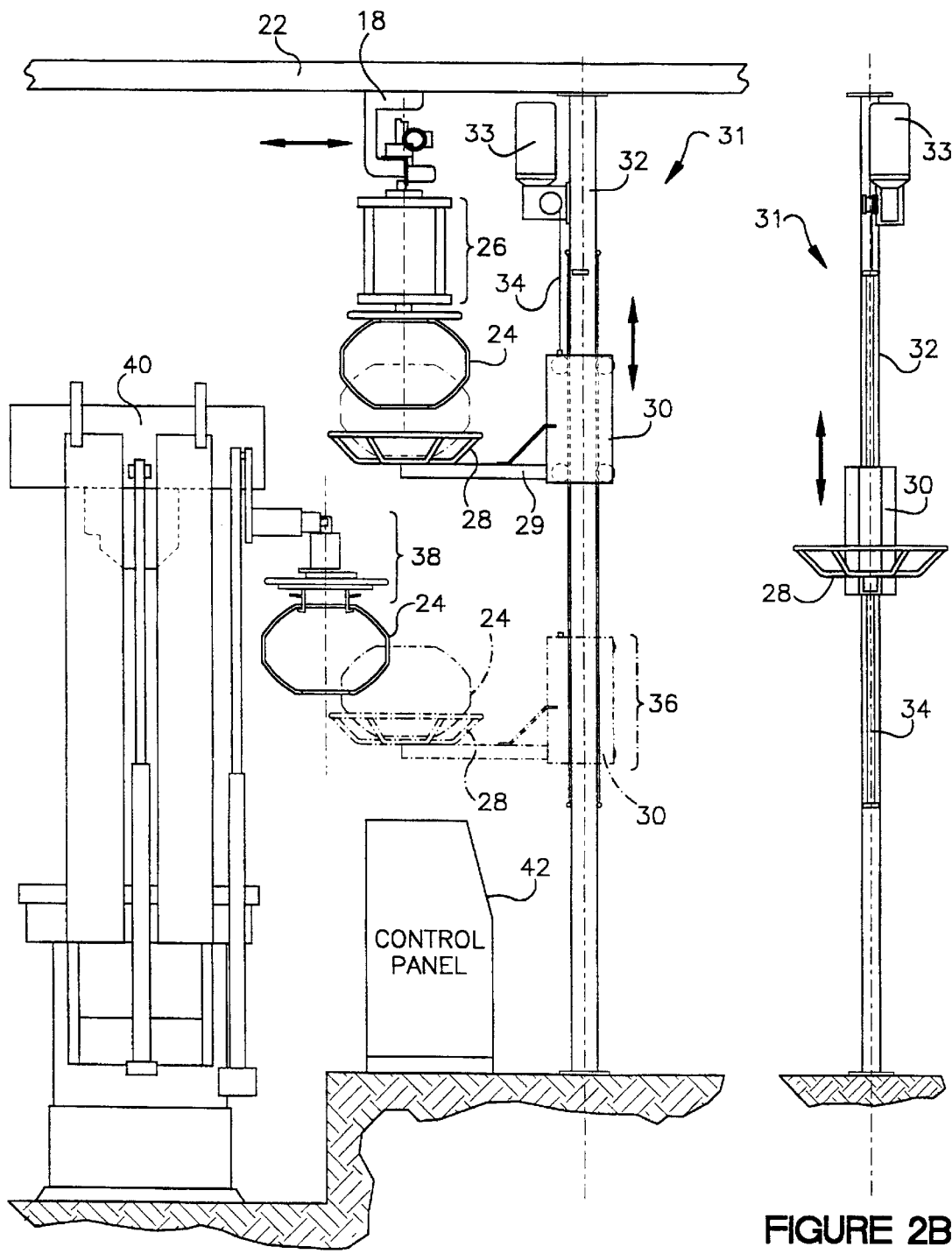
FIG. 2A is a side view schematic showing the monorail, the elevator system, the tire press and press loader of the present invention.
FIG. 2B is a front view of the tire elevator and basket of the present invention.

In addition to the functions listed above, each monorail conveyor carrier 18 carries a device that is able to read the tags, such as barcode labels that are placed on each green tire 24, as is shown in FIG. 2A. Typically, individual tags, such as barcode labels are affixed to each green tire at or near the completion of the tire building process within the tire building area 12 of the factory 10. Each monorail conveyor carrier 18 carries a single green tire 24 in such a way that the tire's equatorial plane is horizontal, which means that the tire's axis is vertically oriented. The monorail carrier's tire-grasping mechanism 26 can grasp the tire 10 by one of the tire's bead regions. The tire-grasping mechanism 26 of each monorail carrier 18 is able to rotate the tire about the tire's axis in order to find and read the tire's barcode label, which specifies the tire type and the angular orientation (about the tire's axis) at which the tire should be disposed when the tire is delivered to the press 40 (FIG. 2A). In other words, the green tire 24 carried by the monorail carrier 18 can be rotated for two purposes: (1) so that the barcode can be oriented in order to be read by the barcode reader/scanner; and (2) so that the green tire can be properly angularly oriented so that, when the green tire 24 is loaded by the press loader 38 into the press 40 (FIG. 2A), the tire's angular orientation within the press will be in accordance with the specific tire's design needs. For example, the tire can be angularly oriented to take into account the uniqueness of each green tire with respect to the location of the lettering on the sidewalls of the tire as well as taking into account the location of the "tread splice" and other artifacts of both tire design and tire construction. The information contained in the barcode also informs the main control center 21 as to the type of tire being carried on each particular carrier 18. The geographic location of each tire inside the factory is continually monitored and known at the main control center as a result of the two-way radio frequency (RF) communication link between the main control center and each monorail carrier 18.

The tire grasping mechanism 26 of each carrier 18 is able to angularly orient each tire 24 in such a way as to take into account the angular motions of the press loader 38 and the elevator 30. Thus, each green tire 24 arrives within the respective press at a predetermined angular orientation with respect to that press.

Summary of the Sequence of Operation of the Monorail System

FIG. 2A shows, in summary, a monorail carrier 18 suspended from a monorail 22. Green tire 24 is suspended by the carrier's tire-grasping mechanism 26, which can expand or contract in order to grasp or release the green tire 24. The tire-grasping mechanism 26 of the monorail carrier 18 releases the green tire 24 into an elevator system 31 which includes a basket 28 attached to an elevator 30 that rides on a vertical support rail 32.

The tire-grasping mechanism 26 of the monorail carrier 18 can rotate the tire 24 about its axis, as described hereinabove. A motor 33, secured to support rail 32, controls the vertical motion of the elevator 30 and its basket 28. FIG. 2B shows a second view of the elevator system 31, with its elevator 30, vertical support rail 32, and the chain or cable 34 driven by conventional means, such as the motor 33, to raise or lower the basket 28 and the elevator 30. The term "elevator system" generally refers to the intermediate tire conveying system, comprising an elevator 30 with an attached basket 28 that can move upward or downward in a vertical path with respect to vertical support 32, which receives individual green tires from the monorail carrier and moves the tires to within grasping range of the press loader 38 by each tire press 40 as is discussed hereinafter.

The monorail carrier 18 deposits the green tire 24 at a first or upper location in the basket 28 attached to the elevator 30, after which the elevator 30 moves along a vertical path to a second or lower position or location 36, as shown in FIG. 2A. The green tire 24 in the basket 28 attached to the elevator 30 in the lower position 36 can then be carried in the basket 28, as the basket moves through a circular arc with respect to elevator 30, the radius of which arc is defined by the arm 29 which supports the basket 28. The basket can either move through the arc in conjunction with its movement along the vertical path or subsequent to arriving at the lower location where the green tire is transferred to the loader 38, which is typically an integral part of the tire press 40. With the latter construction, the arm portion of the loader 38 rotates within a horizontal plane in such a way as to allow the loader to retrieve the tire 24 from the elevator basket 28 and then deliver the tire into the press 40. A control panel 42 at the site of the press 40 allows onsite manual control and override of the automated processes in the event of emergencies or in case of the need for specialized control or override of the automated processes.

Figure 3B:
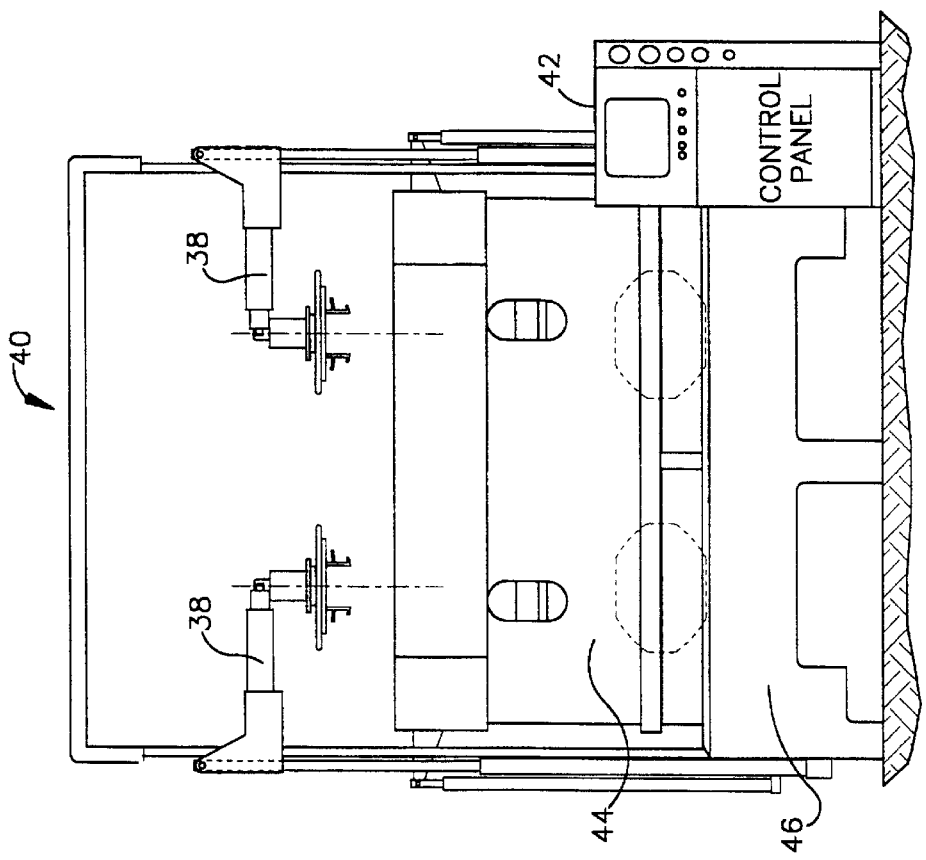
FIG. 3B is a front view schematic of a closed tire press.
Figure 3A:
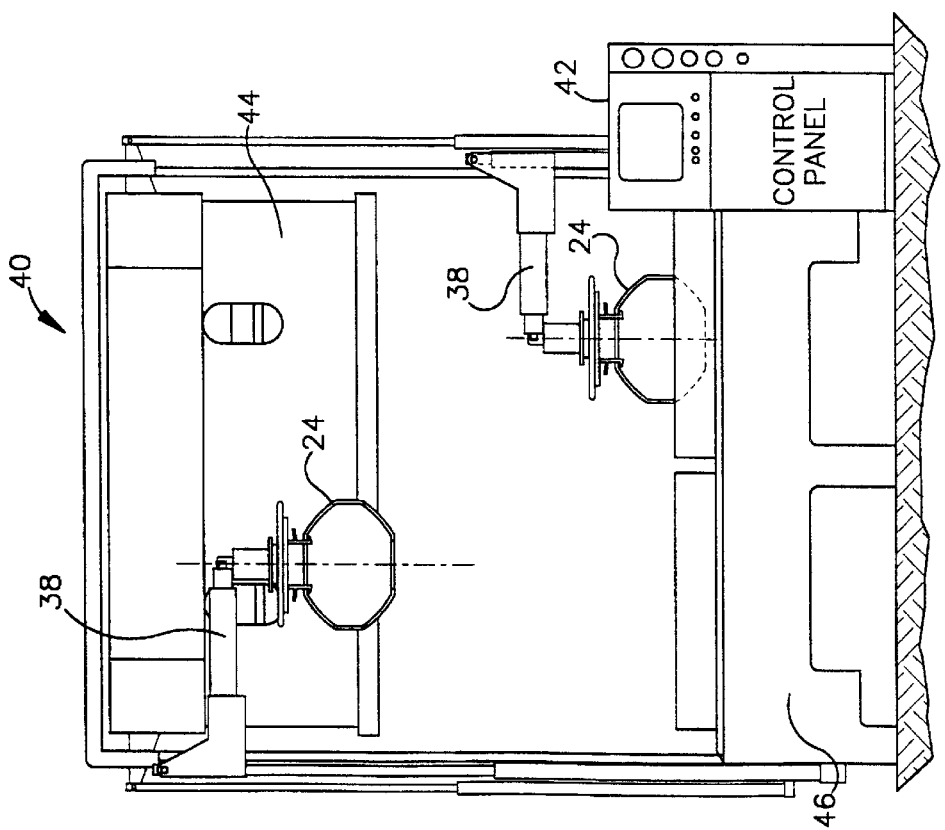
FIG. 3A is a front view schematic of an open tire press.

FIG. 3A shows the tire press 40 in the open position, with the upper mold half 44 raised. The press loaders 38 which operate in conjunction with each press 40 have two degrees of motion: they can move up and down, and they can rotate within a horizontal plane. For example, as shown in FIG. 2A, loaders 38 can retrieve green tires from the basket 28 of the elevator system 31 and then move each green tire 24 into the press 40. FIG. 3B shows the tire press 40 in the closed position, with the upper mold half 44 in a lowered position in relation to the lower mold half 46. The press 40 is closed after the tires 24 have been loaded into the press.

Figure 4:
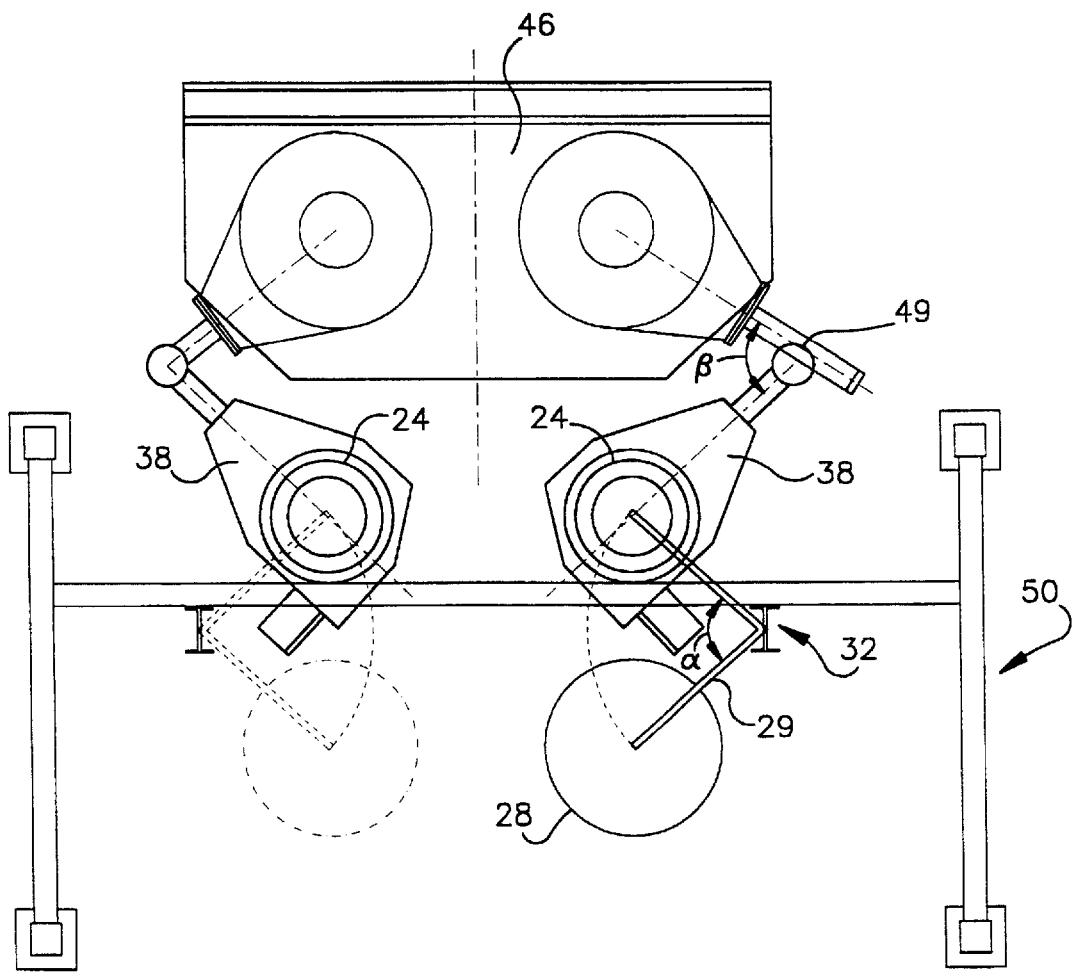
FIG. 4 is a top view schematic of a tire press and its loaders.

FIG. 4 is a top view of the lower part 46 of the press 40. Superstructure 50 supports the vertical support rails 32 of the elevator system 31 with its elevator 30 and the elevator's basket 28 and moveable arm 29. The basket 28 is able to swing through an angular arc α within a horizontal plane from the first location where the basket 28 receives the green tire 24 to the lower, second location prior to the green tire being handed off to the loader 38 of the press. The arm of the loader 38 is able to pivot through an angle β about the loader's vertical support structure 49 as it receives the tire 24 from the basket 28 of the elevator 30 (which is unlabelled as such in FIG. 4 and shows only the vertical support rail or girder 32 upon which the elevator moves upward or downward).

It is important to note that the use of the press loaders 38 are necessary due to the way in which modern tire presses open and close. Referring back to FIGS. 3A and 3B, the top part or mold half 44 of the press 40 lifts vertically upward from the lower part or mold half 46 of the press. Older style presses, ones of the "watch-case" design, had upper mold sections that opened by hinging backward in such a way that the lower mold sections of the press were directly accessible from above. Thus the older watch-case style presses allowed for the loading of the green tires into the press directly from above, rather than requiring them to be brought in from the side, as in the case of the newer style presses in which the upper mold section rises vertically rather than hinging backward and out of the way. Thus, there is a need for the elevator system 31 of the present invention, and the associated parts such as the vertical support rail or beam 32, the elevator 30 and arm 29 and the basket.

In operation, the elevator 30 receives in the basket 28 the green tire 24 from the monorail carrier 18 at a first location. The elevator 30 is then lowered with its basket to a second location at which the arm and basket can angularly move within a horizontal plane with respect to the elevator so that the tire can be transferred to the press loader 38 of the press 40. Finally, the press loader 38 loads the green tire by moving the tire horizontally into the press. While the basket 28 is generally unmovably attached to the arm 29, it is also within the terms of the invention to provide a power system (not shown) that rotates the basket 28 with respect to arm 29 so that the angular position at which the green tire is loaded into a tire press can be easily controlled.

Intermediate Tire Storage and Tire Storage Buffers

The elevator system 31 and its related parts, shown in FIGS. 2A, 2B, 4 and 5A, are an essential feature of the present invention. The elevator system 31 allows for the automated transfer of green tires into the new style tire presses, i.e., presses which have top mold halves 44 that lift vertically off from the bottom mold halves 31 of the present invention. Another significant advantage of using the elevator system, as an intermediate step in the transfer of the green tire from the monorail to the tire press, is that the elevator 30 provides an inherent intermediate tire storage or buffer for tires awaiting processing within each respective tire press 40 while the monorail carrier is free to transfer another green tire to another press. Earlier style automated green tire transfer systems, most notably the one described in U.S. Pat. No. 4,268,219 by Nakagawa et al., allowed a remotely controlled overhead conveyor system to deliver green tires directly into older style presses in which the top of the press, when open, was hinged back out of the way from the bottom of the press. That is to say, the top of the old-style watch-case press did not interfere with the vertical delivery of the tire directly downward into the press. The disadvantage of these prior art systems was that more monorail carriers were required or the transfer was slower because the monorail carrier was held up at a specific press until the tire was inserted therein. By contrast, the present invention reduces the need for monorail carriers because the use of the elevator system 31 introduces an additional tire buffer storage system right at the location of each of the tire presses whereby a green tire can be delivered and immediately transferred into a basket 28 to free up the monorail carrier. Moreover, the tires can then be transferred to the tire loader associated with each press so that two tires are in the tire buffer storage provided at each press, i.e. one in the basket and the other in the loader. In other words, the elevator systems, in conjunction with the press loaders associated with each tire press, provide at the site of each press, a two-tier tire storage buffer, thereby increasing the efficiency and speed of transporting green tires from the building area 12 to the tire press area 14.

FIG. 5A shows a second embodiment of an elevator system 54. The vertical support rail 56 of the elevator system 54 is suspended from an upper support beam 59 which, in FIG. 5A, is ceiling-suspended. In other words, the vertical support rail 56 is not mounted upon or anchored to the floor, as is the embodiment shown in FIGS. 2A and 2B. In FIG. 5A, the monorail carrier 18 delivers the green tire 24 into the basket 28 when the basket is in the elevated position 58 at a first location along a vertical path which is parallel to an axis through rail 56. The basket 28 is then lowered, and rotated i.e., pivoted within a horizontal plane about the elevator's vertical support rail 56, into a third position or location where the green tire 24 can be retrieved by the loader 38 and then loaded into the press 40.

FIG. 5B shows, in simplified schematic form, a third embodiment of the elevator system 63 wherein the arm 29 that supports the basket 28 is not able to rotate in a horizontal plane about the ceiling mounted vertical support post 57. In this embodiment of the elevator system 63, the elevator's basket 28 receives the tire from a monorail carrier (not shown) when the elevator system 63 is in the location designated by A. The elevator system then moves translationally, under the power of conventional means such as motor 62, along the upper rail 60 to the location designated by B at which point the green tire 24 can be received by the loader 38 associated with a press, not shown in FIG. 5B.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. An automated green tire conveyance system for moving a plurality of green tires to a plurality of tire presses; each tire press having an associated press loader capable of horizontal movement of a green tire having a vertical tire axis; and the conveyance system including an overhead monorail track with one or more monorail carriers movable thereon, the automated green tire conveyance system characterized by:

a plurality of elevator systems, each located by and associated with one of the plurality of tire presses, for receiving green tires from the one or more monorail carriers; and each of the plurality of elevator systems having an elevator for conveying the green tire from the one or more monorail carriers to the press loader of the tire press by that elevator, such that the elevator presents the green tire to the press loader with a vertical tire axis.

2. The conveyance system of claim 1 characterized in that:

the elevator moves in a vertical path and has attached thereto a supporting arm with a basket connected at the distal end of the supporting arm; and the basket receives the green tire from the one or more monorail carriers at a first location and is moveable to a second location where the green tire is unloaded from the basket by the corresponding press loader of the tire press by that elevator.

3. The conveyance system of claim 2 characterized in that:

the supporting arm and the basket are angularly moveable about a vertical supporting rail that extends in the direction of the vertical path.

4. The conveyance system of claim 1 characterized in that:

the elevator system is moveable in horizontal linear translation from a first location where the tire is transferred from the one or more monorail carriers to a third location where the tire is transferred from the elevator system to the press loader.

5. The conveyance system of claim 1 characterized in that:

each of the one or more monorail carriers has a tire-grasping apparatus that angularly orients each green tire about its axis such that subsequent angular motions of the elevator system and the press loader are taken into account in delivering the green tire to a predetermined angular orientation within the tire press.

6. The conveyance system of claim 2 characterized in that:

the basket angularly orients each green tire about its axis such that subsequent angular motions of the elevator system and the press loader are taken into account in delivering the green tire to a predetermined angular orientation within the tire press.

7. The conveyance system of claim 2 characterized in that:

the press loader and the basket of the elevator system can simultaneously store green tires while another tire is processed in the associated tire press.

8. A method for conveying a plurality of green tires to a plurality of tire presses with a plurality of overhead monorail carriers, wherein each tire press has an associated press loader capable of horizontal movement of a green tire having a vertical tire axis; the method characterized by the steps of:

utilizing a plurality of elevator systems wherein each elevator system is associated with one press loader;

transferring each green tire from one of the plurality of monorail carriers to the press loader of one of the plurality of tire presses; and for each transfer, utilizing the elevator system to control moving the green tire along a vertical path from a first location where the green tire is unloaded from the monorail carrier to a second location below the first location, such that the vertical axis of the green tire is maintained.

9. The method of claim 8 including the step of:

utilizing the elevator system to angularly move the green tire through a circular arc from the second location to a third location where the green tire is transferred to the press loader of the tire press.

10. The method of claim 8 including the step of:

utilizing the elevator system to translationally move the green tire horizontally from the second location to a third location where the green tire is transferred to the press loader of the tire press.

11. The method of claim 8 including the step of:

angularly orienting each green tire about the axis of the tire such that subsequent angular movements are taken into account in delivering the green tire to the tire press at a predetermined angular orientation within the tire press.

12. The method of claim 11 including the step of:

angularly orienting the green tire while the tire is suspended from the monorail carrier.

13. The method of claim 11 including the step of:

angularly orienting the green tire by rotating a basket connected to an elevator of the elevator system that transfers the tire from the monorail carrier to the press loader.

\* \* \* \* \*